US012595203B2

(12) United States Patent
Mitta

(10) Patent No.: US 12,595,203 B2
(45) Date of Patent: Apr. 7, 2026

(54) OPTICAL FIBER GLASS PREFORM AND METHOD FOR MANUFACTURING OPTICAL FIBER GLASS PREFORM

(71) Applicant: Shin-Etsu Chemical Co., Ltd., Tokyo (JP)

(72) Inventor: Ryo Mitta, Ibaraki (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 249 days.

(21) Appl. No.: 18/316,243

(22) Filed: May 12, 2023

(65) Prior Publication Data

US 2023/0278907 A1 Sep. 7, 2023

Related U.S. Application Data

(62) Division of application No. 17/848,367, filed on Jun. 23, 2022, now Pat. No. 11,680,007.

(30) Foreign Application Priority Data

Jul. 1, 2021 (JP) ................................. 2021-109906

(51) Int. Cl.
    *C03B 37/012* (2006.01)
    *C03B 37/014* (2006.01)
    *C03C 13/04* (2006.01)
(52) U.S. Cl.
    CPC .. *C03B 37/01211* (2013.01); *C03B 37/01251* (2013.01); *C03B 37/01446* (2013.01);
    (Continued)

(58) Field of Classification Search
    None
    See application file for complete search history.

(56) References Cited

U.S. PATENT DOCUMENTS 5,674,306 A 10/1997 Hoshino
6,178,779 B1 * 1/2001 Drouart ................. C03B 23/207
                                                              65/36

(Continued)

FOREIGN PATENT DOCUMENTS

CN 1884165 A 12/2006
JP S54155212 A 12/1979
(Continued)

OTHER PUBLICATIONS

JPH0648757A Machine Translation by Clarivate Analytics retrieved Jun. 9, 2025. (Year: 2025).*

(Continued)

*Primary Examiner* — Lisa L Herring

(57) ABSTRACT

Provided is an optical fiber glass preform in which a starting rod and a dummy glass are hardly separated from each other, and a method for manufacturing the glass preform. In the optical fiber glass preform, the dummy glass is fitted into one end of the starting rod, and a part of the dummy glass and the starting rod are surrounded by a clad glass. In the manufacturing method, at the time of connecting the starting rod and the dummy glass, a shape is adjusted in such a manner that an iron is brought into contact with a connection portion and is moved from a starting rod side toward a dummy glass side with appliance of a load.

6 Claims, 8 Drawing Sheets

4

(52) U.S. Cl.
 CPC ...... *C03B 2201/12* (2013.01); *C03B 2201/31*
 (2013.01); *C03C 13/045* (2013.01); *Y10T*
 *428/2949* (2015.01)

(56) References Cited

U.S. PATENT DOCUMENTS

| | | |
|---|---|---|
| 2008/0176091 A1 | 7/2008 | Abe |
| 2011/0274129 A1 | 11/2011 | Bauer |
| 2023/0020384 A1 | 1/2023 | Mitta |

FOREIGN PATENT DOCUMENTS

| | | | | |
|---|---|---|---|---|
| JP | S58148030 U | 10/1983 | | |
| JP | S60260432 A | 12/1985 | | |
| JP | S6163543 A | 4/1986 | | |
| JP | S6385024 A | 4/1988 | | |
| JP | H0624784 A | 2/1994 | | |
| JP | H0648757 A | * 2/1994 | ....... | C03B 37/01486 |
| JP | H06199533 A | 7/1994 | | |
| JP | H1121143 A | 1/1999 | | |
| JP | H11189428 A | 7/1999 | | |
| JP | 2000327358 A | 11/2000 | | |
| JP | 2004115301 A | 4/2004 | | |
| JP | 2004277245 A | 10/2004 | | |
| JP | 2006133496 A | 5/2006 | | |
| JP | 2007112688 A | 5/2007 | | |
| JP | 2007320781 A | 12/2007 | | |
| JP | 2012512796 A | 6/2012 | | |
| JP | 2013119508 A | 6/2013 | | |
| JP | 2014080299 A | 5/2014 | | |
| JP | 7250850 B2 | 4/2023 | | |

OTHER PUBLICATIONS

Office Action issued for counterpart Japanese Application No. 2021-109906, issued by the Japanese Patent Office on Oct. 25, 2022 (drafted on Oct. 14, 2022).

Extended European Search Report for counterpart European Application No. 22181557.4, issued by the European Patent Office on Nov. 28, 2022.

Those references were submitted as IDS or found by the examiner over the earlier U.S. Appl. No. 17/848,367, filed Jun. 23, 2022.

Office Action issued for related Japanese Application No. 2022-194981, transmitted from the Japanese Patent Office on May 7, 2025 (drafted on Apr. 21, 2025).

Office Action issued for counterpart Chinese Application 202210646147.2, issued by The State Intellectual Property Office of People's Republic of China on Feb. 5, 2026.

* cited by examiner

5

6

OPTICAL FIBER GLASS PREFORM AND METHOD FOR MANUFACTURING OPTICAL FIBER GLASS PREFORM

CROSS-REFERENCE TO RELATED APPLICATIONS

This application is a divisional of U.S. patent application Ser. No. 17/848,367, filed on Jun. 23, 2022, which claims priority to Japanese Patent Application No. 2021-109906 filed in JP on Jul. 1, 2021, the contents of which is incorporated herein by reference in their entirety.

BACKGROUND

1. Technical Field

The present invention relates to an optical fiber glass preform and a method for manufacturing the optical fiber glass preform.

2. Related Art

As a method for manufacturing an optical fiber glass preform, a method of sintering a porous glass preform obtained by a VAD method or an OVD method is known.

Patent Document 1 describes a method in which an optical fiber glass preform is produced by depositing glass fine particles for a clad on an outer periphery of a starting member obtained by welding dummy glasses to both ends of a starting rod, that is, on an outer periphery of the starting rod, joints between the starting rod and the dummy glasses, and a part of the dummy glasses, and heating a deposited porous glass in a high-temperature furnace to form a transparent clad glass.

Regarding a connection method between the starting rod and the dummy glass, Patent Document 2 describes a method of pressing an iron against a connection portion and "reciprocating" the iron to smooth the connection portion. In addition, Patent Document 3 describes a method in which the outer diameter of a bump-shaped portion is made equal to the outer diameter of the dummy glass by repeatedly pressing and separating the dummy glass and the starting rod while heating the connection portion.

Patent Document 1: Japanese Patent Application Publication No. H11-189428

Patent Document 2: Japanese Patent Application Publication No. H6-199533

Patent Document 3: Japanese Patent Application Publication No. 2014-80299

However, when the optical fiber glass preform produced by the above-described method was heated in a subsequent process in a state where a dummy glass 1 was bonded to a suspension shaft or the like and hanged down (FIG. 1A), and a load was applied, a separation 5 was likely to occur in the vicinity of the joint (FIG. 1B). A damage 6 of the optical fiber glass preform may occur due to the separation, which is problematic (FIG. 1C).

In the starting rod, in addition to germanium doped to increase the refractive index of a core, an appropriate amount of fluorine may be doped in a clad to form a depressed portion or trench portion with a reduced refractive index. In particular, when the fluorine was doped in the starting rod portion joined to a dummy rod, a separation was likely to occur in the vicinity of the joint.

In this regard, the present invention has been made in view of the above, and an object thereof is to suppress separation of the starting rod and the dummy glass.

GENERAL DISCLOSURE

In order to solve the above problems, an optical fiber glass preform of the present invention includes: a starting rod; a dummy glass configured to be fitted into one end of the starting rod and integrally joined; and a clad glass configured to surround a part of the dummy glass and the starting rod.

According to the present invention, the starting rod is fitted into one end of the dummy glass and integrally joined, and thus even when the dummy glass is hanged down and heated in a state where a load is applied, a separation in the vicinity of a joint is less likely to occur.

DESCRIPTION OF EXEMPLARY EMBODIMENTS

Hereinafter, an example of a method for manufacturing an optical fiber glass preform according to the present invention will be described with reference to the accompanying drawings. Note that the present invention is not limited by the embodiment described below.

Figure 1A:
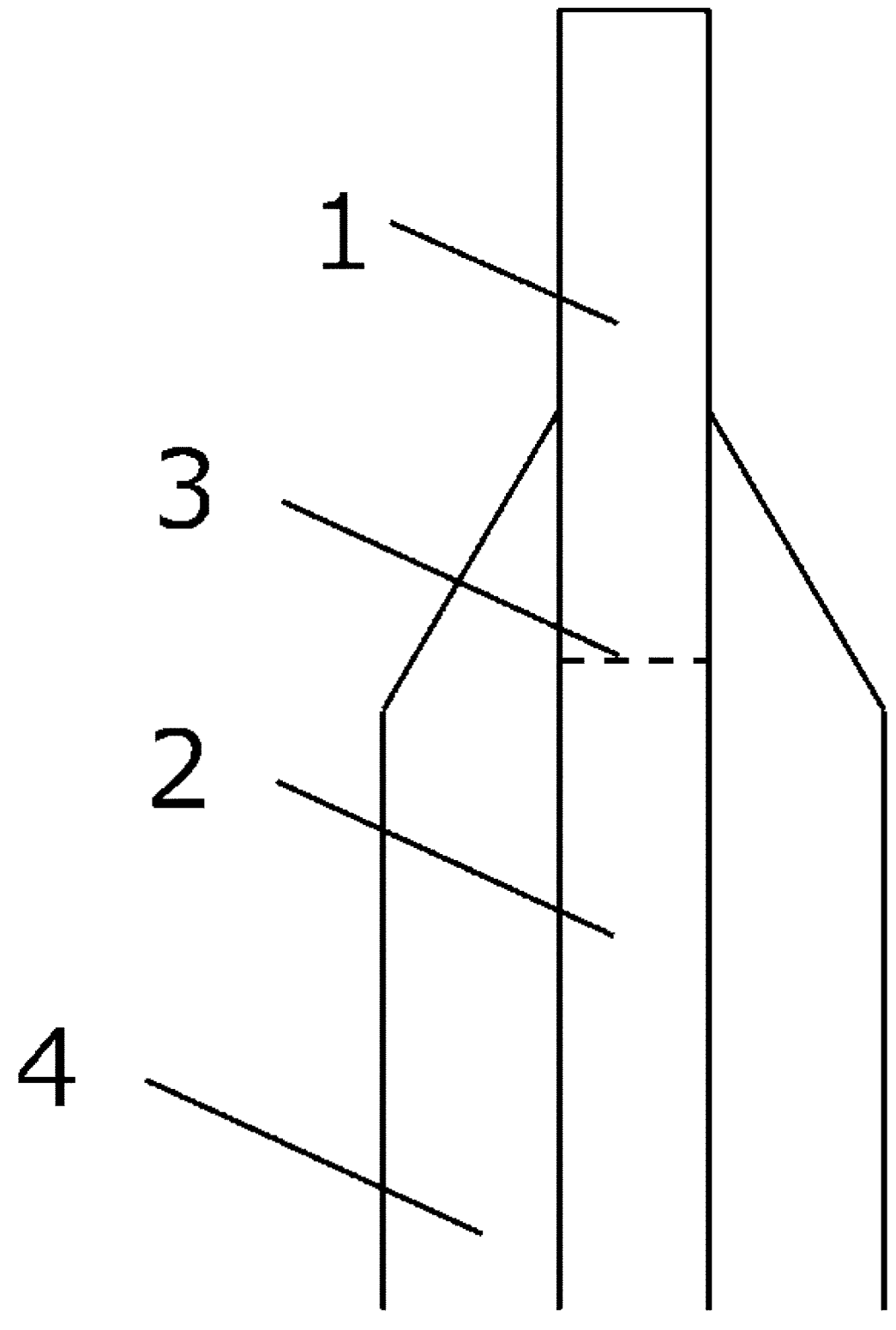
FIG. 1A is a schematic view illustrating an example of a conventional starting rod, dummy glass connection, and optical fiber glass preform.
Figure 1B:
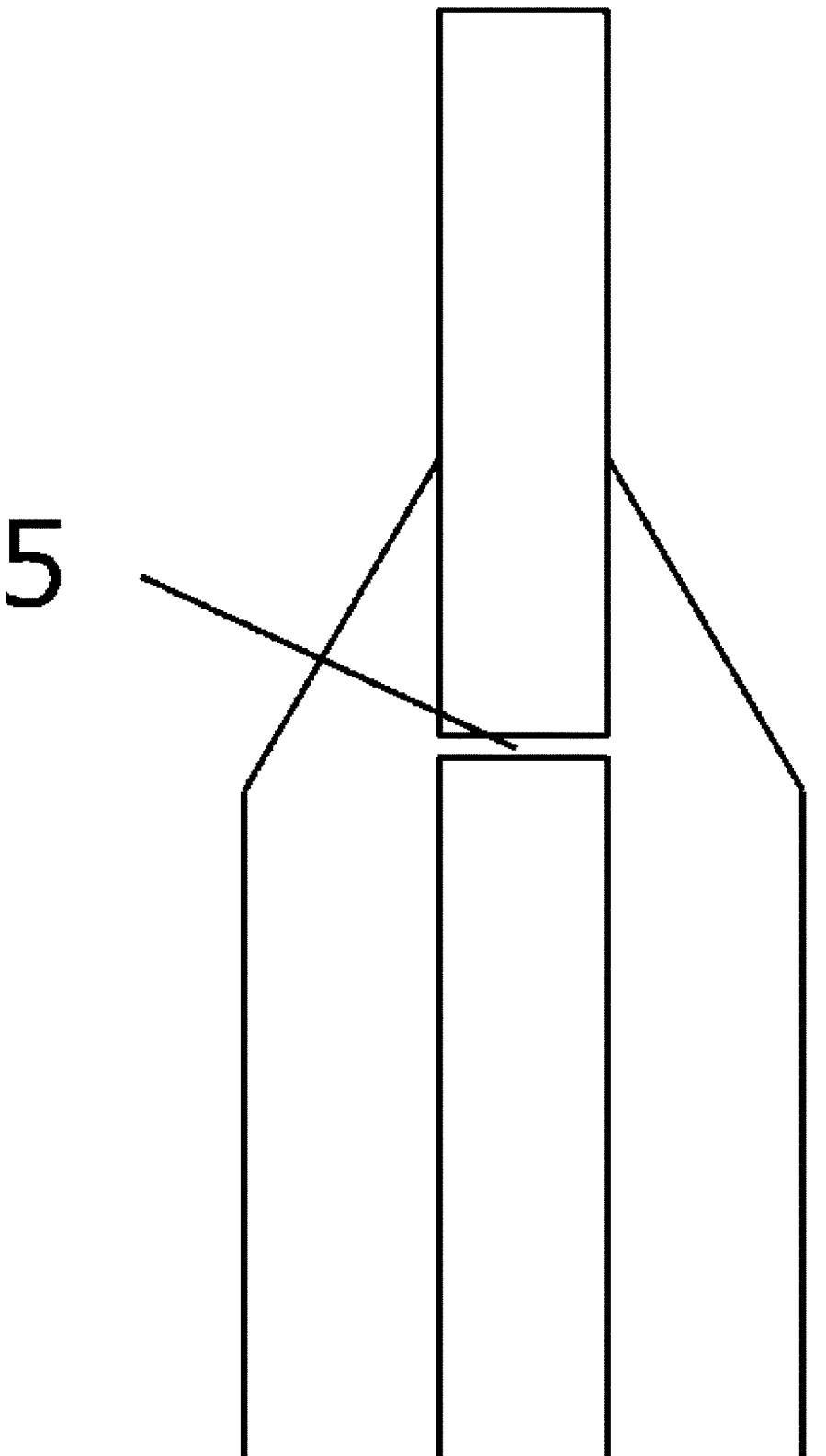
FIG. 1B is a schematic view illustrating the example of the conventional starting rod, dummy glass connection, and optical fiber glass preform.
Figure 1C:
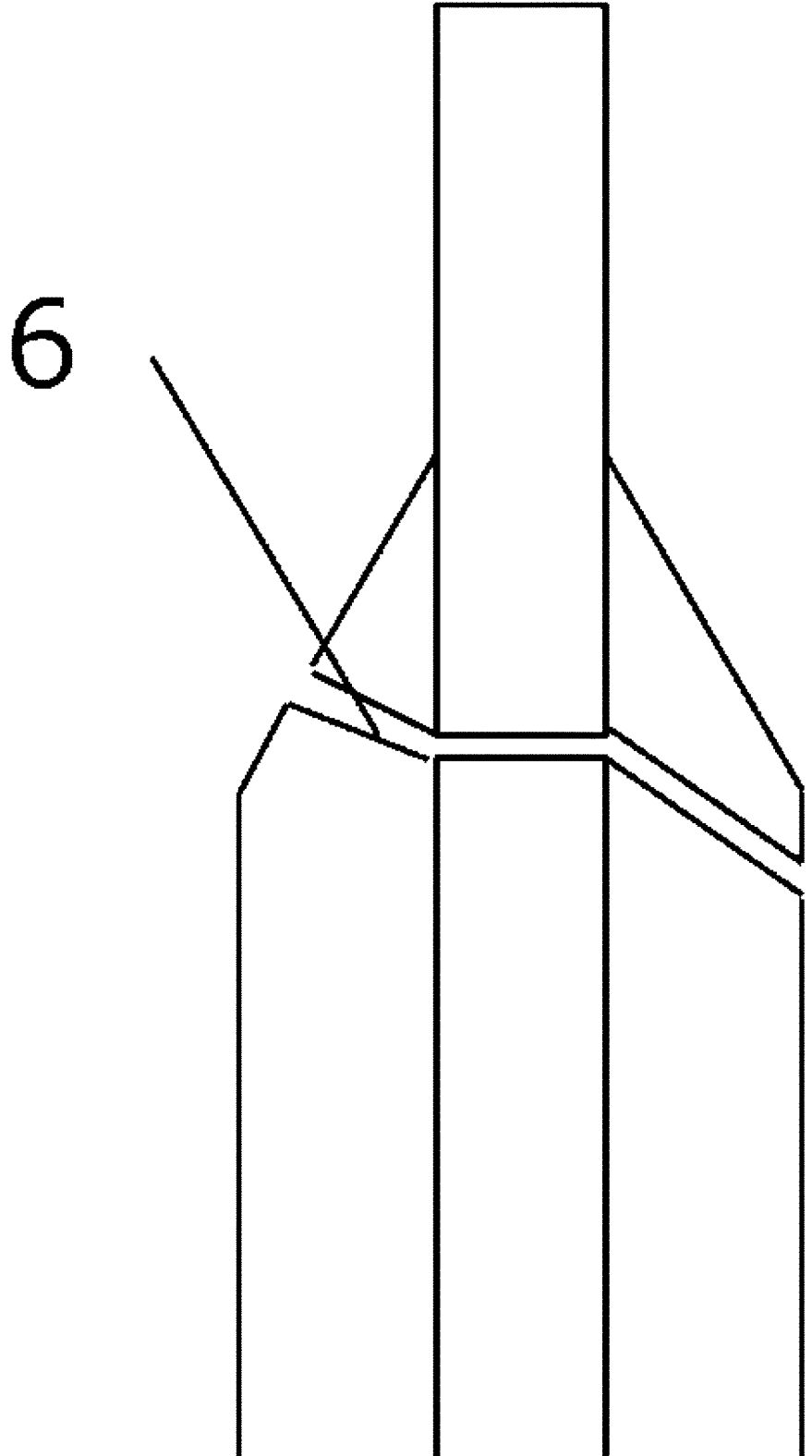
FIG. 1C is a schematic view illustrating the example of the conventional starting rod, dummy glass connection, and optical fiber glass preform.
Figure 2A:
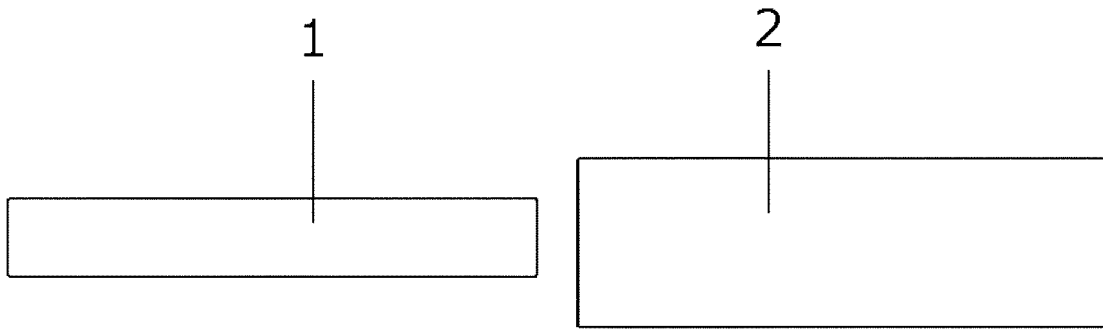
FIG. 2A is a schematic view illustrating an example of a starting rod, a dummy glass connection, and an optical fiber glass preform according to the present invention.
Figure 2B:
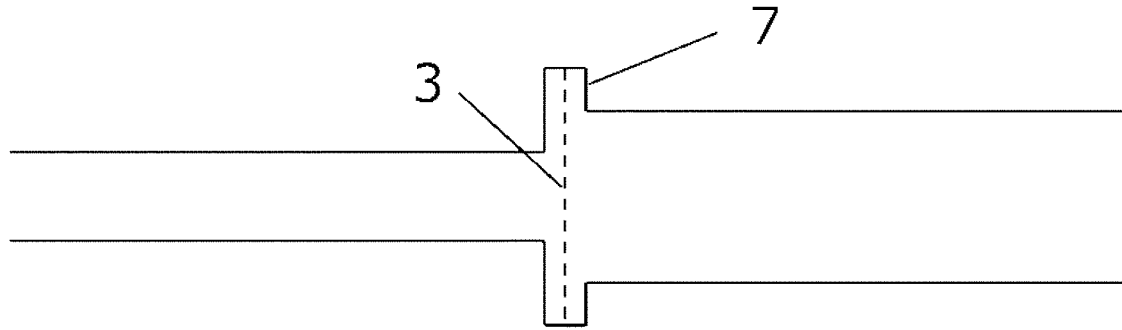
FIG. 2B is a schematic view illustrating the example of the starting rod, the dummy glass connection, and the optical fiber glass preform according to the present invention.
Figure 2C:
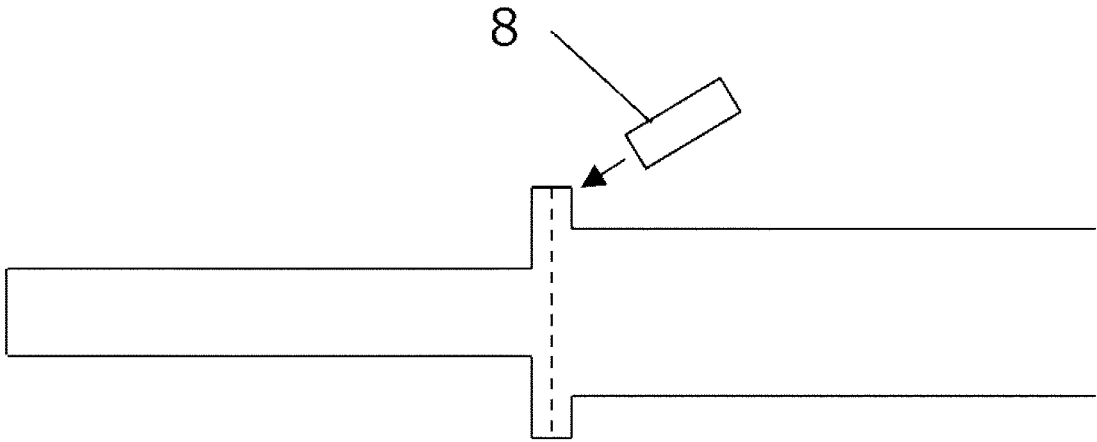
FIG. 2C is a schematic view illustrating the example of the starting rod, the dummy glass connection, and the optical fiber glass preform according to the present invention.
Figure 2D:
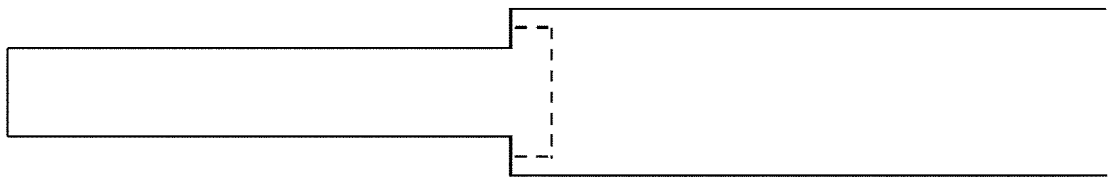
FIG. 2D is a schematic view illustrating the example of the starting rod, the dummy glass connection, and the optical fiber glass preform according to the present invention.
Figure 2E:
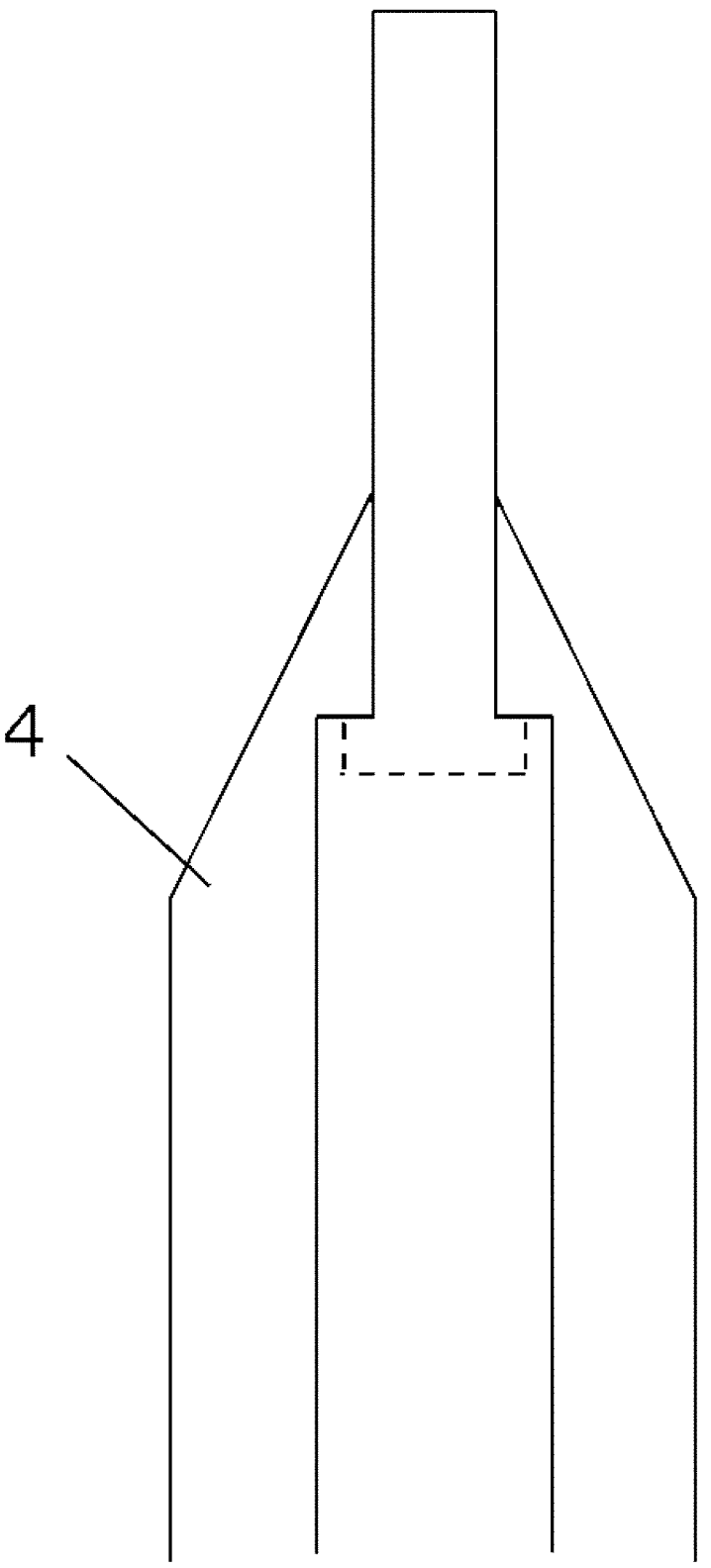
FIG. 2E is a schematic view illustrating the example of the starting rod, the dummy glass connection, and the optical fiber glass preform according to the present invention.

An optical fiber glass preform of the present embodiment is manufactured by joining a dummy glass 1 and a starting rod 2 (FIGS. 2A to 2D) and forming a clad glass 4 to surround a part of the dummy glass 1 and the starting rod 2 (FIG. 2E).

In the optical fiber glass preform of the present invention, the dummy glass 1 is fitted into the starting rod 2 and integrally joined at a joint 3 between the dummy glass 1 and the starting rod 2. That is, apart of the dummy glass 1 is joined in the state of entering the starting rod 2 side from the end surface of the starting rod 2. In a subsequent process, by supporting the dummy glass 1 joined in this manner and suspending the optical fiber glass preform, a separation in the vicinity of the joint 3 is less likely to occur.

Such joining with the dummy glass 1 may be performed at both ends of the starting rod 2, and in this case, there is an advantage that a separation in the vicinity of the joint is less likely to occur even when the dummy glasses 1 are supported and suspended at both the ends.

The dummy glass 1 and the starting rod 2 are preferably airtightly joined at the joint 3. When air bubbles remain in the joint 3 and are confined, a separation between the starting rod 2 and the dummy glass 1 may occur starting from the air bubbles.

The starting rod 2 is a member to be a central portion of the optical fiber glass preform to be manufactured and is preferably added with a dopant to correspond to the refractive index distribution of an intended optical fiber. For example, a hollow round rod shape is formed in which a center is silica glass doped with germanium (Ge), and the surrounding area is surrounded by pure silica glass or silica glass doped with fluorine (F). (The starting rod may have a hollow round rod shape.)

The shape of the joint 3 at which the joining end of the dummy glass 1 is fitted into the joining end of the starting rod 2 is not particularly limited, but it is preferable that the dummy glass 1 and the starting rod 2 are joined in a state where the central axes of the cross-sectional circles of the dummy glass 1 and the starting rod 2 coincide with each other. In this way, a stress distribution in the circumferential direction of the cross section becomes uniform at the joint 3. When the dummy glass 1 is a solid round rod, a state is preferable in which the central portion of the joint end of the dummy glass 1 is fitted into the joining end of the starting rod 2 (FIG. 2D). In particular, the present invention can be suitably applied to a case where the outer diameters of the starting rod and the dummy glass are the same.

However, when the dummy glass containing a large amount of dopant impurities is used, the viscosity of the dummy glass may be lower than that of the starting rod when heated to the same temperature. In this case, the joint may be processed such that the central portion of the joining end of the starting rod is fitted into the joining end of the dummy glass. The effects similar to those of the present embodiment can also be obtained by such processing.

As illustrated in FIGS. 2A to 2E, when the outer diameter of the dummy glass 1 is smaller than the outer diameter of the starting rod 2, it is also preferable to form a state where the joining end of the dummy glass 1 is entirely fitted into the joining end of the starting rod. On the other hand, when the outer diameter of the dummy glass is larger than the outer diameter of the starting rod, a state may be formed in which the joining end of the starting rod is entirely fitted into the joining end of the dummy glass. The dummy glass may have a circular tube shape (hollow round rod), which reduces the weight of the dummy glass.

The present invention is particularly effective when the dummy glass 1, the starting rod 2, and the clad glass 4 contain glasses having dopant compositions different from each other. In this case, the joint 3 of a connection portion can be visually observed.

For example, the starting rod for an optical fiber is synthetic quartz glass to which dopants such as germanium (Ge) and fluorine (F) are added to adjust the refractive index, while the clad glass is synthetic quartz glass hardly containing these dopants. In such a synthetic quartz glass, in order to reduce light absorption, OH groups are removed to have an OH group content of 1 ppm or less, and chlorine (Cl) of 100 ppm or more is contained. On the other hand, inexpensive natural quartz glass is often used as the dummy glass.

When a set of three different types of glasses of dummy glass, starting rod, and clad glass is used for formation, stress tends to concentrate at the vicinity of the joint. In a subsequent process, thermal energy is applied to the joint, and further, almost all the load of an optical fiber glass preform body is applied, so that the separation of the joint easily proceeds. The optical fiber glass preform of the present invention is effective in suppressing the separation of the joints of such different glasses and is more effective particularly when the starting rod is doped with fluorine. In this case, it is effective when the doping amount of fluorine is 0.7 wt % or less, and it is further effective when the doping amount of fluorine is 0.5 wt % or less.

In a method for manufacturing the optical fiber glass preform of the present invention, the distal ends of the dummy glass 1 and the starting rod 1 are faced to each other by a processing device such as a glass lathe (FIG. 2A) and then pressed and welded after being heated and softened by flame or the like (not illustrated), so that a large-diameter portion 7 having an outer diameter larger than that of the dummy glass 1 or the starting rod 2 is produced at a joining portion (FIG. 2B). When a processing iron 8 is brought into contact with the large-diameter portion 7 to level the large-diameter portion, the processing iron 8 is brought into contact with the large-diameter portion and moved from the starting rod 2 side toward the dummy glass 1 side while applying a load, thereby leveling the bulge of the large-diameter portion 7 (FIG. 2C) and forming the joint 3 in which the joining end of the dummy glass 1 is fitted into the joining end of the starting rod 2 (FIG. 2D). Here, "leveling" the bulge of the large-diameter portion 7 means equalizing the outer diameter of the large-diameter portion 7 so that a difference with the outer diameter of the starting rod 2 becomes small, it is preferable that the difference between both outer diameters is 10% or less of the outer diameter of the starting rod 2, and it is more preferable that the difference is 5% or less. When the large-diameter portion 7 is not leveled, the flow of glass fine particles blown to the starting rod 2 in a glass fine particle deposition process as a subsequent process is impaired, and the formation of a glass fine particle deposition layer is likely to be disturbed.

By adopting this method, the large-diameter portion 7 can be easily shaped, and the processing of the dummy glass 1 and the starting rod 2 can be completed. When the distal end of the dummy glass 1 is fitted into the starting rod 2 (FIG. 2D), local stress and a load concentration hardly occur, so that the separation of glass is less likely to occur. Note that the joint 3 of the connection portion indicated by a dotted line in the drawing can be visually observed.

The fitting depth of the dummy glass into the starting rod can be adjusted by, for example, the size of the diameter of the large-diameter portion formed by welding the end surfaces of the softened dummy glass and the starting rod to each other. When the large-diameter portion is large, the fitting depth can be made large, and when the large-diameter portion is small, the fitting depth can be made small. In addition, the adjustment may be made by adjusting a heating temperature at the time of molding the large-diameter portion to change the degree of softening of glass or by adjusting the load applied by the iron and the moving speed of the iron at the time of molding the large-diameter portion.

In the present invention, at least one of the end surfaces of the starting rod and the dummy glass before being welded desirably has a convex shape. When both end surfaces of the starting rod and the dummy glass are flat, air bubbles may remain at the time of welding both end surfaces to be confined in the joint. When at least one of both end surfaces is formed into a convex shape, the convex portion is welded while being deformed to form the joint, so that air bubbles do not remain. In addition, when the large-diameter portion produced at the time of welding is shaped with the processing iron, the large-diameter portion formed by connecting convex portions or a convex portion and a flat surface is smooth as compared with the large-diameter portion formed by connecting flat surfaces, and thus there is also an advantage that it is easy to shape.

As for processing of a tip into a convex shape, it is preferable to grind the tip with a grinder or the like in advance. In the protrusion of a convex portion, the center may be raised, but the convex portion may be deviated outward from the center.

A protruding amount is preferably 0.5 times or more and 2 times or less a radius. When the protruding amount is less than 0.5 times, air bubbles are likely to remain, and when the protruding amount exceeds 2 times, the convex portion is likely to be deformed during heating by flame to hang down.

In the present invention, the outer diameter of the dummy glass is preferably smaller than the outer diameter of the starting rod. Since the main purpose of the dummy glass is to support the starting rod in the processes of glass fine particle deposition and sintering, it is not necessary to make the dummy glass thicker than necessary. In addition, as described above, the joining end of the dummy glass can be easily fitted into the joining end of the starting rod by applying the iron to the starting rod side of the large-diameter portion (the portion where the outer diameter is increased) formed at the joint between the starting rod and the dummy glass to apply a load toward the dummy glass side and leveling the large-diameter portion. (Although the size of the starting rod is determined by the size of the intended optical fiber glass preform or the design of the refractive index distribution,) when the dummy glass is as thin as possible, the amount of heat, time, and load required for heating and joining can be reduced to facilitate processing. EXAMPLES The starting rod manufactured by using a VAD method and made of synthetic quartz glass including a core was prepared to have an outer diameter of 50 mm and a length of 1500 mm and have flat surfaces at both ends. The starting rod is distinguished into a manufacturing start side and a manufacturing end side of the VAD method. In addition, the starting rod prepared here is not doped with fluorine.

An end surface of the starting rod on the manufacturing start side of the VAD method was gripped by one chuck of the glass lathe toward another chuck, a dummy glass made of natural quartz glass and having an outer diameter of 50 mm and a length of 500 mm was gripped by the another chuck, and while rotating the chucks, the end surface of the starting rod on the manufacturing start side and the end surface of the dummy glass were heated to about 2000° C. with oxyhydrogen flame emitted from a burner to be softened. This state is referred to as (α).

Example 1

From (α), the end surfaces were welded to each other by bringing the chucks close to each other, and the connection portion was bulged (a large-diameter portion was formed). The maximum diameter of the bulged connection portion (large-diameter portion) was 54 mm. While continuing the heating of the connection portion by the oxyhydrogen flame, an operation of leveling the bulge (large-diameter portion) of the connection portion was performed by bringing the processing iron made of high purity carbon into contact with the starting rod side of the bulged connection portion (large-diameter portion) and moving the processing iron toward the dummy glass side while applying a load. The maximum diameter of the connection portion after the operation was 51 mm. At the joint, the dummy glass was fitted by 1 mm into the starting rod.

Example 2

From (α), the end surfaces were welded to each other by bringing the chucks close to each other, and the connection portion was bulged (a large-diameter portion was formed). The maximum diameter of the bulged connection portion (large-diameter portion) was 56 mm. While continuing the heating of the connection portion by the oxyhydrogen flame, an operation of leveling the bulge (large-diameter portion) of the connection portion was performed by bringing the processing iron made of high purity carbon into contact with the starting rod side of the bulged connection portion (large-diameter portion) and moving the processing iron toward the dummy glass side while applying a load. The maximum diameter of the connection portion after the operation was 52 mm. At the joint, the dummy glass was fitted by 3 mm into the starting rod.

Example 3

From (α), the end surfaces were welded to each other by bringing the chucks close to each other, and the connection portion was bulged (a large-diameter portion was formed). The maximum diameter of the bulged connection portion (large-diameter portion) was 57 mm. While continuing the heating of the connection portion by the oxyhydrogen flame, an operation of leveling the bulge (large-diameter portion) of the connection portion was performed by bringing the processing iron made of high purity carbon into contact with the starting rod side of the bulged connection portion (large-diameter portion) and moving the processing iron toward the dummy glass side while applying a load. The maximum diameter of the connection portion after the operation was 52 mm. At the joint, the dummy glass was fitted by 5 mm into the starting rod.

With respect to the connection body of the starting rod and the dummy glass of Examples 1, 2, and 3, the grip of the starting rod by the chuck was released while the chuck for the dummy glass was gripped, another dummy glass made of natural quartz glass and having an outer diameter of 50 mm and a length of 500 mm was gripped by the chuck on the released side, while the chucks are rotated, the end surfaces of the starting rod and the dummy glass were heated to about 2000° C. with oxyhydrogen flame emitted from the burner to be softened, and then the chucks were brought close to each other, so that the end surfaces of the dummy glass and the starting rod on the manufacturing end side of the VAD method were welded to form a large-diameter portion with a bulged connection portion. The maximum diameter of the bulged connection portion (large-diameter portion) was 54 mm. While continuing the heating of the connection portion (large-diameter portion) by the oxyhydrogen flame, an operation of leveling the bulge (large-diameter portion) of the connection portion was performed by putting the processing iron on the bulged connection portion (large-diameter portion) and reciprocating the processing iron between the starting rod side and the dummy glass side of the joint. Accordingly, a target having dummy glasses at both ends of the starting rod were formed.

The dummy glasses at both ends in the target formed in Examples 1, 2, and 3 were gripped by the chucks disposed at both ends in a chamber, and glass fine particles were deposited on the outer periphery of the target by the OVD method to generate a porous glass preform having an outer diameter of 300 mm. The dummy glass, which is joined to the starting rod on the manufacturing start side of the VAD method, of the porous glass preform was connected to the tip of the shaft of the lifting mechanism of a dehydration sintering apparatus, the porous glass preform is inserted into a furnace core tube of the dehydration sintering apparatus in the state of being vertically suspended with the manufacturing start side of the VAD method in the starting rod directed upward and is moved downward while being heated at 1500° C., and the porous glass is sintered to be transparently vitrified, thereby manufacturing an optical fiber glass preform.

In each of the configurations of Examples 1, 2, and 3, ten optical fiber glass preforms were manufactured, a load of 50 kgf was applied downward in a state where the dummy glass on the VAD manufacturing start side was gripped and suspended vertically, and the joint between the starting rod and the dummy glass on the VAD manufacturing start side was visually observed to examine the occurrence rate of separation. The results are shown in Table 1.

TABLE 1

|  | EXAMPLE 1 | EXAMPLE 2 | EXAMPLE 3 |
|---|---|---|---|
| FITTING DEPTH (mm) | 1 | 3 | 5 |
| FITTING DEPTH/OUTER DIAMETER OF STARTING ROD (%) | 2 | 6 | 10 |
| SEPARATION OCCURRENCE RATE OF JOINT (%) | 30 | 20 | 0 |

In all of Examples 1, 2, and 3, a high separation suppression effect of a separation occurrence rate of 30% or less was confirmed. From the comparison of Examples 1, 2, and 3, there is a tendency that the effect of suppressing the occurrence of separation is enhanced when the fitting depth increases. Since the fitting depth of the dummy glass of Example 1 into the starting rod was 1 mm which is the length corresponding to 2% of the outer diameter 50 mm of the starting rod, it is considered that an excellent effect is exhibited particularly when the fitting depth of the dummy glass into the starting rod is equal to or larger than 2% of the outer diameter of the starting rod.

[Examples 4 to 7] As a separate study, the starting rod manufactured by using the VAD method and made of synthetic quartz glass including a core was prepared to have an outer diameter of 50 mm and a length of 1500 mm. In order to form a depressed portion on the outer periphery of the core, this starting rod was doped with fluorine which was divided into five types of 0 wt % ( . . . Example 1), 0.1 wt % ( . . . Example 4), 0.3 wt % ( . . . Example 5), 0.5 wt % ( . . . Example 6), and 0.7 t % ( . . . Example 7). The fluorine concentration of the starting rod is a numerical value obtained by dissolving a part of a glass piece obtained by pulverizing the starting rod and analyzing the result by ion chromatography. For each of these starting rods, ten optical fiber glass preforms were manufactured in a procedure similar to in Example 1.

Comparative Examples 1 and 2

The starting rod manufactured by using the VAD method and made of synthetic quartz glass including a core was prepared to have an outer diameter of 50 mm and a length of 1500 mm. In order to form a depressed type on the outer periphery of the core, this starting rod was doped with fluorine which was divided into two types of 0.5 wt % ( . . . Comparative Example 1) and 0.7 wt % ( . . . Comparative Example 2), thereby reducing transmission loss of the optical fiber obtained by drawing. The fluorine concentration of the starting rod is a numerical value obtained by dissolving a part of a glass piece obtained by pulverizing the starting rod and analyzing the result by ion chromatography.

For the starting rods of Comparative Examples 1 and 2, an end surface of the starting rod on the manufacturing start side of the VAD method was gripped by one chuck of the glass lathe toward another chuck, a dummy glass made of natural quartz glass and having an outer diameter of 50 mm and a length of 500 mm was gripped by the another chuck, and while rotating the chucks, the end surface of the starting rod on the manufacturing start side and the end surface of the dummy glass were softened by being heated to about 2000° C. with oxyhydrogen flame emitted from a burner. On the other hand, the end surfaces were welded to each other by bringing the chucks close to each other, and the connection portion was bulged (a large-diameter portion was formed). The maximum diameter of the bulged connection portion (large-diameter portion) was 54 mm. Thereafter, while continuing the heating by the oxyhydrogen flame, an operation of leveling the bulge of the connection portion was performed by putting the processing iron on the bulged connection portion (large-diameter portion) and reciprocating the processing iron between the starting rod side and the dummy glass side of the joint. The maximum diameter of the connection portion after the operation was 53 mm. However, unlike Examples 1 to 7, the joint between the joining end of the dummy glass and the joining end of the starting rod was planarly joined.

With respect to the connection body of the starting rod and the dummy glass of Comparative Examples 1 and 2, the grip of the starting rod by the chuck was released while the chuck for the dummy glass was gripped, another dummy glass made of natural quartz glass and having an outer diameter of 50 mm and a length of 500 mm was gripped by the chuck on the released side, while rotating the chucks, the end surfaces of the starting rod and the dummy glass were heated to about 2000° C. with oxyhydrogen flame emitted from the burner to be softened, and then the chucks were brought close to each other, so that the end surfaces of the dummy glass and the starting rod on the manufacturing end side of the VAD method were welded to form a large-diameter portion with a bulged connection portion. The maximum diameter of the bulged connection portion (large-diameter portion) was 54 mm. While continuing the heating of the connection portion (large-diameter portion) by the oxyhydrogen flame, an operation of leveling the bulge (large-diameter portion) of the connection portion was performed by putting the processing iron on the bulged connection portion (large-diameter portion) and reciprocating the processing iron between the starting rod side and the dummy glass side of the joint. Accordingly, a target having dummy glasses at both ends of the starting rod were formed.

The dummy glasses at both ends in the target formed in Comparative Examples 1 and 2 were gripped by the chucks disposed at both ends in a chamber, and glass fine particles were deposited on the outer periphery of the target by the OVD method to generate a porous glass preform having an outer diameter of 300 mm. The dummy glass, which is joined to the starting rod on the manufacturing start side of the VAD method, of the porous glass preform was connected to the tip of the shaft of the lifting mechanism of the dehydration sintering apparatus, the porous glass preform is inserted into the furnace core tube of the dehydration sintering apparatus in the state of being vertically suspended with the manufacturing start side of the VAD method in the starting rod directed upward and is moved downward while being heated at 1500° C., and the porous glass is sintered to be transparently vitrified, thereby manufacturing ten optical fiber glass preforms.

With respect to the above-described optical fiber glass preform, the joint between the starting rod and the dummy glass on the manufacturing start side was visually observed to examine the occurrence rate of separation. The results are shown in Table 2.

dummy glass on the manufacturing start side was visually observed to examine the occurrence rate of separation. The results are shown in Table 3.

TABLE 3

|  | EXAMPLE 1 | EXAMPLE 8 | EXAMPLE 9 |
|---|---|---|---|
| END SURFACE SHAPE OF STARTING ROD | FLAT | CONE | PARABOLIC TAPER |
| SEPARATION OCCURRENCE RATE OF JOINT | 30% | 0% | 0% |

TABLE 2

|  | EXAMPLE 1 | EXAMPLE 4 | EXAMPLE 5 | EXAMPLE 6 | EXAMPLE 7 | COMPARATIVE EXAMPLE 1 | COMPARATIVE EXAMPLE 2 |
|---|---|---|---|---|---|---|---|
| DOPING CONCENTRATION OF FLUORINE (wt %) | 0 | 0.1 | 0.3 | 0.5 | 0.7 | 0.5 | 0.7 |
| FITTING DEPTH/ OUTER DIAMETER OF STARTING ROD (%) | 2 | 2 | 2 | 2 | 2 | 0 (NO FITTING) | 0 (NO FITTING) |
| SEPARATION OCCURRENCE RATE OF JOINT (%) | 30 | 30 | 40 | 40 | 60 | 90 | 90 |

From the comparison of Example 5 with Comparative Example 1 and Example 7 with Comparative Example 2, it has been confirmed that even when the fluorine doping concentration of the starting rod is the same, the occurrence of separation of the joint can be significantly suppressed by setting the fitting depth/the outer diameter of the starting rod to 2% or more. The effect of the present invention could be confirmed in a range where the fluorine doping amount of the starting rod was 0.7 wt % or less. A particularly high effect could be confirmed when the fluorine doping concentration of the starting rod was in a range of 0.5 wt % or less.

Example 8

As a separate study, the starting rod manufactured by using the VAD method and made of synthetic quartz glass including a core was prepared to have an outer diameter of 50 mm and a length of 1500 mm. The tip of the starting rod on the manufacturing start side was ground into a convex conical shape having a height of 30 mm by using a disc grinder.

Example 9

Both ends of the starting rod manufactured by using the VAD method, made of synthetic quartz glass including a core, and having an outer diameter of 50 mm and a length of 1800 mm were gripped by the chucks on both sides of the glass lathe, and while a position of 300 mm from the manufacturing start side is heated with the oxyhydrogen flame to be softened, one chuck was moved to perform melting, so that the tip of the starting rod having a length of 1500 mm on the manufacturing start side was molded into a convex parabolic taper shape having a height of 30 mm.

For the starting rods of Examples 8 and 9, ten optical fiber glass preforms were manufactured in a procedure similar to in Example 1, and the joint between the starting rod and the In both Examples 8 and 9, the separation occurrence rate of the joint was 0%. It is considered that since the tip became convex, bubbles did not enter the joint, and thus, the starting point of the separation disappeared, which affected the result. In Examples 8 and 9, the end surface shape of the starting rod is changed, but the same effect can be obtained even when the end surface shape of the dummy glass is changed.

Example 10

As a separate study, the starting rod manufactured by using the VAD method and made of synthetic quartz glass including a core was prepared to have an outer diameter of 50 mm and a length of 1500 mm. An end surface of the starting rod on the manufacturing start side was grasped by one chuck of the glass lathe toward another chuck, a dummy glass made of natural quartz glass and having an outer diameter of 40 mm and a length of 500 mm was gripped by the another chuck, while rotating the chucks, the end surface of the starting rod on the manufacturing start side and the end surface of the dummy glass were softened by being heated to about 2000° C. with oxyhydrogen flame emitted from the burner, and then the chucks were brought close to each other to weld the end surfaces to each other to bulge the connection portion. The maximum diameter of the bulged connection portion was 48 mm. On the other hand, while continuing the heating of the connection portion by the oxyhydrogen flame, an operation of leveling the bulge of the connection portion was performed by bringing the processing iron made of high purity carbon into contact from the starting rod side of the bulged connection portion toward dummy glass side. The maximum diameter of the connection portion after the operation was 45 mm.

Example 11

An end surface of the starting rod on the manufacturing start side was grasped by one chuck of the glass lathe toward another chuck, a dummy glass made of natural quartz glass and having an outer diameter of 60 mm and a length of 500 mm was gripped by the another chuck, while rotating the chucks, the end surface of the starting rod on the manufacturing start side and the end surface of the dummy glass were softened by being heated to about 2000° C. with oxyhydrogen flame emitted from the burner, and then the chucks were brought close to each other to weld the end surfaces to each other to bulge the connection portion. The maximum diameter of the bulged connection portion was 59 mm. On the other hand, while continuing the heating of the connection portion by the oxyhydrogen flame, an operation of leveling the bulge of the connection portion was performed by bringing the processing iron made of high purity carbon into contact from the starting rod side of the bulged connection portion toward the dummy glass side. The maximum diameter of the connection portion after the operation was 54 mm.

For the joining body of the starting rod and the dummy glass of Examples 10 and 11, ten optical fiber glass preforms were manufactured in a procedure similar to in Example 1, and the joint between the starting rod and the dummy glass on the manufacturing start side was visually observed to examine the occurrence rate of separation. The results are shown in Table 4.

TABLE 4

|  | EXAMPLE 1 | EXAMPLE 10 | EXAMPLE 11 |
|---|---|---|---|
| OUTER DIAMETER OF STARTING ROD (mm) | 50 | 50 | 50 |
| OUTER DIAMETER OF DUMMY GLASS (mm) | 50 | 40 | 60 |
| SEPARATION OCCURRENCE RATE OF JOINT (%) | 30% | 0% | 10% |

In Example 10 in which the outer diameter of the starting rod was larger than the outer diameter of the dummy glass, the separation occurrence rate of the joint was 0%. In consideration of the cost of the dummy glass, it is considered desirable that the outer diameter of the starting rod is larger than the outer diameter of the dummy glass.

The present invention is not limited to the above-described embodiment, and proper modifications and improvements can be made arbitrarily.

What is claimed is:

1. A method for manufacturing an optical fiber glass preform, the method comprising:
   heating and joining one end of a starting rod and one end of a dummy glass facing each other;
   forming a large diameter portion having an outer diameter larger than those of the dummy glass and the starting rod at a joining portion between the starting rod and the dummy glass, a joint between the one end of the starting rod and the one end of the dummy glass being included in the large-diameter portion;
   bringing a processing iron into contact with the large-diameter portion and moving the processing iron from a starting rod side of the large diameter portion toward a dummy glass side while applying a load to form the joint where a joining end of the dummy glass is fitted into a joining end of the starting rod;
   depositing a glass particle layer on an outer periphery of the dummy glass and the starting rod; and
   heating the glass particle layer to be transparent.

2. The method for manufacturing an optical fiber glass preform according to claim 1, wherein the starting rod is doped with fluorine.

3. The method for manufacturing an optical fiber glass preform according to claim 1, wherein the starting rod is doped with fluorine of 0.7 wt % or less.

4. The method for manufacturing an optical fiber glass preform according to claim 1, wherein the starting rod is doped with fluorine of 0.5 wt % or less.

5. The method for manufacturing an optical glass preform according to claim 1, further comprising: processing at least one of one end of the starting rod or one end of the dummy glass into a convex shape.

6. The method for manufacturing an optical fiber glass preform according to claim 1, wherein an outer diameter of the dummy glass is equal to or smaller than an outer diameter of the starting rod.

* * * * *